No. 655,227. Patented Aug. 7, 1900.
F. N. HASTINGS.
GLUE HEATER.
(Application filed July 24, 1899.)
(No Model.)

WITNESSES:
Emil L. O. Krieser
C. B. F. Waller

INVENTOR
Frank N. Hastings
BY
Warren E. Willis.
ATTORNEY

UNITED STATES PATENT OFFICE.

FRANK N. HASTINGS, OF MERIDEN, CONNECTICUT.

GLUE-HEATER.

SPECIFICATION forming part of Letters Patent No. 655,227, dated August 7, 1900.

Application filed July 24, 1899. Serial No. 724,994. (No model.)

*To all whom it may concern:*

Be it known that I, FRANK N. HASTINGS, a citizen of the United States, and a resident of Meriden, in the county of New Haven and State of Connecticut, have invented certain new and useful Improvements in Glue-Heaters, of which the following is a specification.

My invention relates to improvements in heating devices in which an inner vessel is employed as a receptacle for the substance to be heated, the said inner vessel being surrounded by an annular case susceptible of containing a heated medium, as water, for the purpose of its conducting to the inner vessel a portion of its heat. This outer case may be, and usually is, arranged at its upper end to come in contact with and to support the inner vessel, forming a joint more or less tight. The lower end of this case rests normally upon a hollow metallic base, through which is allowed to pass a jet or current of steam, so that its heat may be imparted by metallic contact to the medium contained in the outer case and thence to the inner vessel, which is immersed therein.

My invention relates more particularly to the means employed for adjusting the outer case in relation to the base, so that the temperature of the substance to be heated may be under control. It is obvious that if the direct surface contact be broken between the outer case and base, even if but little space intervenes, less heat will be transmitted.

I attain these objects by the construction illustrated in the accompanying drawings, in which—

Figure 1:
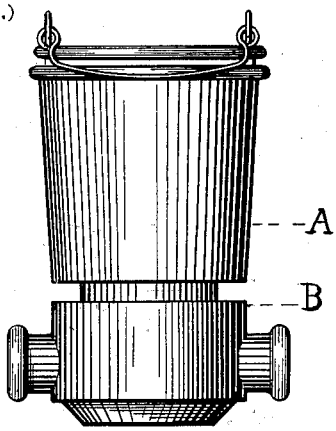
Figure 2:
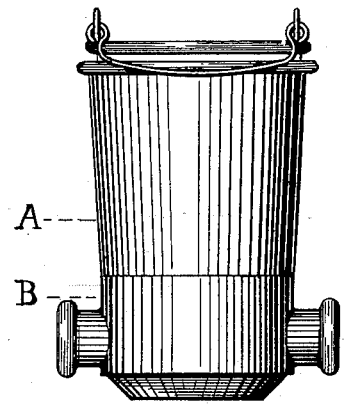
Figure 3:
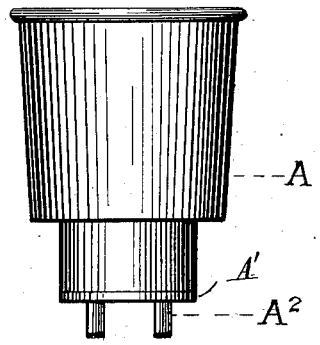
Figure 4:
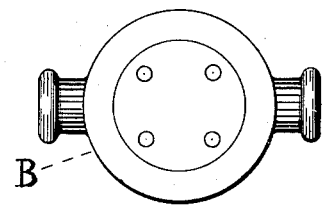
Figure 5:
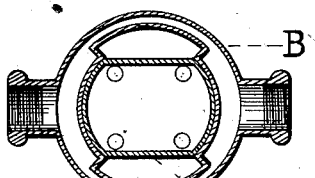
Figure 6:
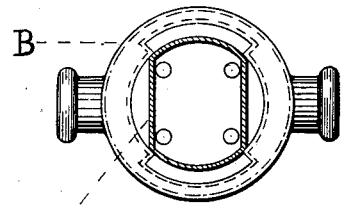

Figure 1 is a side elevation of the assembled device, showing the outer vessel A slightly raised from the base B. Fig. 2 is a side elevation of the assembled device, showing the outer vessel A in contact with the base B. Fig. 3 is a side elevation of the outer vessel A, showing the plate A' and projections A² attached to its bottom. Fig. 4 is a plan view of the steam-chamber base B. Fig. 5 is a horizontal section of the steam-base B and outer case A central with the steam-openings and showing a somewhat-different construction. Fig. 6 is a plan view of the steam-base B and a section of the outer case A, turned so as to be out of contact.

The means which I employ consist of an annular ring or plate A', riveted or otherwise secured to the bottom of the outer case A or integral with it, having several downwardly-projecting lugs A², arranged as shown in Fig. 3. Through the part of the annular steam-base B, that forms its bottom, are holes (see Fig. 4) corresponding to the projections on the bottom of the outer case A, Fig. 3. Now if the said outer case be raised and partly revolved its weight, with that of the inner vessel, its contents, and the conducting medium, will be sustained by the projections on its bottom resting upon the inner upper surface of the bottom of the pit or opening in the annular steam-base, as shown in Fig. 1; but if the projections are permitted to enter the holes in the said steam-base the outer case will rest upon its seat, as in Fig. 2, and a greater amount of heat will be transmitted, because of the close contact of the larger heating area. In order to still further reduce the surface contact between the outer case and steam-base, I may also, in place of making the lower part of the outer case of a continuous circular form, flatten it upon two opposite sides, so that a full quarter-turn will entirely remove it from contact with the steam-base except for a small amount of area contained in the ends of the projections. In this device I form the interior walls of the steam-base in the shape shown in Figs. 5 and 6, which is in effect circular, but of two different radii, the portion that forms one-quarter of the circumference on each of the two opposite sides agreeing with that of the lower end of the outer case, while on the sides adjacent to these the walls are carried back, so as to be out of contact with the said outer case at all times.

I am aware that previous to my invention heating devices have been made with provisions for adjusting or controlling the heat delivered to the inner vessel. I therefore do not claim such a combination broadly; but What I do claim as my invention, and desire to secure by Letters Patent, is—

1. The combination, in a steam-heater, adapted to be used with an inner vessel of a circular outer case having a bottom of smaller diameter and flattened on two opposite sides, and of a hollow steam chamber or base, having a semi-annular central cavity and oppositely-disposed segmentally-recessed chambers leading outwardly from said cavity, all substantially as set forth.

2. The combination, in a steam-heater, adapted to be used with an inner vessel, of a circular outer case, having its lower end of lesser diameter than its body, and flattened on two opposite sides, and of an annular base, cored for the passage of a current of steam, having a semi-annular central cavity and two oppositely-disposed segmentally-recessed chambers leading outwardly from the central cavity; a series of projections forming a part of and depending downwardly from the lower end of the outer case, and a corresponding series of holes extending through the bottom of the cavity or depressed central portion of the steam-base, all substantially as described and for the purpose as set forth.

In testimony whereof I have affixed my signature in presence of two witnesses.

FRANK N. HASTINGS.

Witnesses:
ALBERT G. KUHNLE,
CLARENCE L. PIERRE.